US008520909B2

(12) United States Patent
Leung et al.

(10) Patent No.: US 8,520,909 B2
(45) Date of Patent: Aug. 27, 2013

(54) AUTOMATIC AND SEMI-AUTOMATIC IMAGE CLASSIFICATION, ANNOTATION AND TAGGING THROUGH THE USE OF IMAGE ACQUISITION PARAMETERS AND METADATA

(75) Inventors: Clement Ho Cheung Leung, Hong Kong (HK); Chun Fan Wong, Hong Kong (HK); Jiming Liu, Hong Kong (HK)

(73) Assignee: Hong Kong Baptist University, Kowloon Tong, Kowloon (HK)

( * ) Notice: Subject to any disclaimer, the term of this patent is extended or adjusted under 35 U.S.C. 154(b) by 102 days.

(21) Appl. No.: 13/255,241

(22) PCT Filed: Mar. 11, 2010

(86) PCT No.: PCT/CN2010/000296
§ 371 (c)(1),
(2), (4) Date: Sep. 8, 2011

(87) PCT Pub. No.: WO2010/102515
PCT Pub. Date: Sep. 16, 2010

(65) Prior Publication Data
US 2011/0317885 A1 Dec. 29, 2011

Related U.S. Application Data

(60) Provisional application No. 61/159,091, filed on Mar. 11, 2009.

(51) Int. Cl.
G06K 9/00 (2006.01)
(52) U.S. Cl.
USPC .......................................... 382/118
(58) Field of Classification Search
None
See application file for complete search history.

(56) References Cited

U.S. PATENT DOCUMENTS

| 7,555,165 B2 | 6/2009 | Luo et al. |
| 2004/0225686 A1 | 11/2004 | Li et al. |
| 2005/0289142 A1* | 12/2005 | Adams .............................. 707/6 |

(Continued)

FOREIGN PATENT DOCUMENTS

WO WO2007/005118 A2 1/2007

OTHER PUBLICATIONS

Wong and Leung, Automatic Semantic Annotation of Real-World Web Images, IEEE Transactions on Pattern Analysis and Machine Intelligence vol. 30 No. 11, pp. 1933-1944, Nov. 2008.

*Primary Examiner* — Nirav G Patel
(74) *Attorney, Agent, or Firm* — Ella Cheong Hong Kong; Sam T. Yip

(57) ABSTRACT

A method for characterizing image contents automatically or semi-automatically using image acquisition parameters and metadata is presented. The method establishes probabilistic and deterministic relationships between different types of metadata and the semantic attributes and contents of images. It furnishes a mechanism that enables the automatic and semi-automatic classification, annotation, tagging, indexing, searching, identification or retrieval of images based on their contents, semantic properties and metadata characteristics. The method uses, but is not limited to, image capture metadata such as focal length, exposure time, relative aperture, flash information, ISO setting, angle of view, subject distance, timestamp, GPS information as well as other forms of metadata, including but not limited to, captions, keywords, headings, tags, comments, remarks, titles which may be automatically, semi-automatically, or manually generated. The present invention can be applied to image databases, web searching, personal search, community search, broad-based or vertical search engines for internet, intranet, extranet or other usages.

18 Claims, 1 Drawing Sheet

Automatic semantic characterization of images

(56) References Cited

U.S. PATENT DOCUMENTS

2009/0185723 A1* 7/2009 Kurtz et al. .................. 382/118
2009/0222432 A1 9/2009 Ratnakar
2010/0226582 A1* 9/2010 Luo et al. .................... 382/224

* cited by examiner

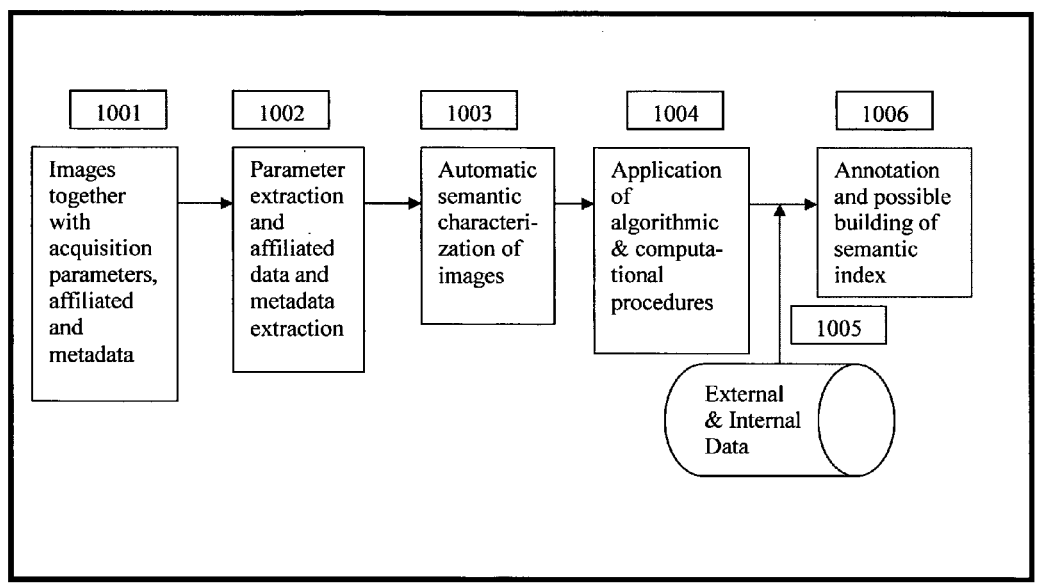
Automatic semantic characterization of images

AUTOMATIC AND SEMI-AUTOMATIC IMAGE CLASSIFICATION, ANNOTATION AND TAGGING THROUGH THE USE OF IMAGE ACQUISITION PARAMETERS AND METADATA

CROSS-REFERENCE TO RELATED APPLICATIONS

This application claims priority to and the benefit of U.S. Provisional Application No. 61/159,091 filed Mar. 11, 2009, the disclosure of which is incorporated by reference herein.

FIELD OF THE INVENTION

The present invention relates to systems and processes useful for a search engine or part of a search engine which utilizes metadata and/or non-metadata, which are automatically, semi-automatically, or manually acquired, to characterize, search, and retrieve image repositories based on semantic image attributes and contents.

BACKGROUND OF THE INVENTION

The number of electronic images being created is increasing at a rapid rate, and searching them semantically presents a significant challenge. Many raw images are made available with few meaningful direct annotations of semantic content, limiting their search and discovery. While some image repositories or Web sites encourage tags or keywords to be included manually, such is far from universal. Manual characterization of semantic image contents is often subjective, labor intensive, and inconsistent. The relative time-consuming process of manual characterization or annotation is also unlikely to be able to keep up with the rate of creation of images through digital and non-digital means.

There have been attempts in the imaging art to characterize image contents. For example, U.S. Pat. No. 7,555,165 relates to a method for semantic scene characterization using camera data and content-based cues. However, this patent does not use GPS data, time information nor image-recognition techniques such as face detection, face recognition which limits the amount of information that can be determined about an unknown image. This patent also is limited to placing images into classes and does not provide annotations which are richer and more versatile.

Published U.S. Patent Application 2009-0222432 relates to geo-tagging and automatic generation of metadata for photos and videos. Although the use of GPS coordinates is helpful in the classification of images, it does not provide the means to characterize the content of images.

IEEE Transactions on Pattern Analysis and Machine Intelligence, Vol. 30, No. 11, pp. 1933-1944, November, 2008, authored by the present inventors and the disclosure of which is incorporated by reference herein, discusses semantic annotation of images using metadata extraction. Color feature extraction, shape feature extraction, and texture feature extraction are further applied to images to create a semantic database of images.

However, there remains a need in the art for improved annotation and classification of semantic image contents. For example, using the present invention, an image may be automatically annotated as "Jack Kennedy by the sea at sunset in Gold Coast, Australia on the eve of the Indian Ocean Tsunami.", which is not possible with the above-mentioned art.

SUMMARY OF THE INVENTION

The present invention relates to systems and processes useful for a search engine or part of a search engine which utilizes metadata and/or non-metadata, which are automatically, semi-automatically, or manually acquired, to characterize, search, and retrieve image repositories based on image contents and semantic attributes. It furnishes a mechanism to automatically or semi-automatically produce annotations, tags, and classifications of images based on their contents and semantic attributes that will result in their identification, discovery and retrieval. The invention can be applied to web searching, personal search, community search, broad-based or vertical search engines for internet, intranet, extranet or particular knowledge domains.

One aspect of the invention relates to a method which supports the search and identification of images by making use of the relationships between the automatically acquired image acquisition and related parameters, such as exposure time, focal length, f-number, relative aperture, flash firing information, ISO setting, angle of view, subject distance, timestamp, and GPS (Global Positioning System) information to identify, classify and annotate particularly the semantic attributes and contents of images. The method includes the application of rules—probabilistic or deterministic—that correlate the values of such parameters to infer and classify the semantic contents of images.

From such processes, the images may be searched and retrieved by their semantic attributes and contents without the need for manual annotation or tagging. Further enrichment of image semantics may be performed through the focused application and corroboration of specific image processing, SIFT and related techniques, together with other forms of metadata such as captions or keywords as well as ontological and commonsense reasoning. The invention enables the automated generation of high precision semantic image annotations and characterization, through which high precision searching of a vast amount of otherwise un-indexed image collections becomes feasible. Through such automatic techniques, the search of images via their semantic attributes and contents through automatic means is possible.

BRIEF DESCRIPTION OF THE DRAWINGS

FIG. 1 illustrates a conceptual block diagram of a method according to the present invention which is used to automatically furnish semantic characterization of the semantic attributes and contents of images.

DETAILED DESCRIPTION OF THE INVENTION

The present invention relates generally to the characterization of image contents and semantic attributes, which may take the form of any retrieval criteria employed by humans, to search and find images. Accordingly, the drawings and descriptions are to be regarded as illustrative in nature, and not as restrictive. The present invention is particularly useful for indexing images automatically. This invention will obviate the need to perform time-consuming manual indexing which has shown to be costly and, if done by a small unrepresentative group, can also produce a biased and subjective indexing structure.

The present invention makes use of metadata, which is descriptive information embedded inside an image. Certain descriptive information is typically automatically generated at image creation. For example, EXIF information (Exchangeable Image File Format), usually includes information such as date and time an image was recorded, resolution, camera settings such as shutter speed, ISO, focal length, exposure time, f-number, relative aperture, amount of compression applied, color information, flash firing information, angle of view, subject distance, etc., depending on the make and model of the image recorder, such as a camera. Newer digital cameras often include GPS (Global Positioning System) parameters as well.

Other types of metadata that are often associated with image files are IPTC (International Press Telecommunications Council), developed initially for news bureaus, XMP (Extensible Metadata Platform), developed by Adobe, and MPEG-7 ("Multimedia Content Description Interface"). MPEG-7 provides a set of audiovisual description tools (the metadata elements and their structure and relationships, that are defined by the standard in the form of descriptors and description schemes) to create descriptions for multimedia content. However, the present invention is applicable to any metadata embedded in or associated with an image file, regardless of format type.

Referring now to FIG. 1, there is depicted a general block diagram that illustrates one aspect of the method of the present invention. It includes a repository (1001) of images which are typically, but not necessarily, digital images. Such images may incorporate the metadata discussed above such as image acquisition parameters as well as other metadata such as timestamp, and GPS (Global Positioning System) information. There may also be data affiliated with the image such as contents classification, annotation, tags, annotation, captions, keywords, headings, comments, remarks, titles, related texts, surrounding texts, or linked text. Such image acquisition parameters, metadata, and/or affiliated data will then be recognized and extracted (1002). This recognition and extraction can be performed by any conventional technique such as the use of a search engine that uses metadata parameters in searching as are commercially available, for example, on the Internet.

The semantic characterization of images, which may include scene classification, annotation, or tagging will follow (1003). This step (1003) will include the processing of the image acquisition parameters and metadata, the formulation and application of rules that link the image acquisition parameter values to the semantic attributes and contents of images. In addition, algorithmic and/or computational procedures may also be applied (1004). Such procedures will be able to further extract information about the image. These include, but are not limited to, Scale-invariant feature transformation (SIFT), edge detection, interest point detection, corner detection, blob detection, interest point detection, ridge detection, feature extraction, feature detection, color extraction, color composition, color histograms construction, color detection, shape detection, boundary detection, face detection, and face recognition. Using these techniques, the presence of objects, scenes, buildings, people, etc. can be further ascertained and corroborated from the initial rule-based annotation. The resultant data, either in their unprocessed form or processed form, may be used as meaningful retrieval criteria.

As an example, the characterization of image data may the form of rules, either deterministic or probabilistic or a combination, and/or other computational procedures and algorithms. The characterization may directly or indirectly lead to the classification, annotation, tagging, enrichment, indexing, searching, identification or retrieval of images. For instance, using a particular rule to characterize an image may lead to the automatic addition of annotation information to the image which will more easily facilitate semantic searching of that image.

The images characterized by the methods of the present invention may be Web images, non-Web images or images in other public or private image repositories. They may be digital or non-digital images. The method can be applied to image databases, web searching, personal search, community search, broad-based or vertical search engines for internet, intranet, extranet or other usages.

According to another aspect of the present invention the characterization or metadata may be enriched and expanded through looking up external or internal databases; for example, the temperature or weather of a given location may be annotated or indexed through retrieving the temperature or weather information for a given place at a certain time (e.g., as ascertained from the image date and timestamp) from a separate database, and such information may be used to access or characterize the relevant images. The characterization, including any enrichment, may take the form of any image retrieval criteria employed by humans.

A further example of a rule relating the image acquisition parameters and image content may be: when the focal length belongs to a specific set of values, and the exposure time belongs to a specific set of values, and the subject distance belongs to a specific set of values, and the timestamp belongs to a specific set of values, and the relative aperture belongs to a specific set of values, then this would imply that the image is likely to be of a certain type of scene or contain certain types of contents. Such rules may make use of conjunction and/or disjunction in combining the properties of the image acquisition parameters, affiliated data, and metadata.

Note that the metadata, non-metadata, image acquisition parameters and/or other forms of internal or external data although may or may not be included among an image file formats but may be directly or indirectly recordable or extractable. For example, these may include the presence, detection or recognition of faces, fingerprints or other biometric or related data. Further, captions, keywords, headings, tags, comments, remarks, related texts, surrounding texts, linked texts, and/or descriptions may also be examined and used to characterize the image and/or enrich the semantic properties of the image.

Additionally, image processing algorithms and procedures such as SIFT (scale-invariant feature transform), shape, color, feature, texture extraction techniques may also be employed to characterize the image and/or enrich the metadata for the image.

According to a further aspect of the present invention, rules governing the image acquisition parameters may indicate an image as a sunrise or sunset scene, which together with GPS coordinates and timestamp, face recognition, correlation with face databases and news databases would enable the image to be automatically annotated as "sunset by the sea in autumn in Gold Coast, Australia."

Subsequently, such data may be further correlated and enriched from external data or multiple databases (1005), such as the weather log, news data of a given place for a given time, or face database The semantic characterization (1003), algorithmic and computational procedures (1004) together with any enrichment (1005) may lead to the annotation of the image as "Jack Kennedy by the sea at sunset in Gold Coast, Australia on the eve of the Indian Ocean Tsunami" (1006) which may be used as image retrieval criteria to search for relevant images. Appropriate indexes (1006) may also be built from these to facilitate the search process. That is, the enrichment information may be associated with the image as metadata and/or be added to an index for ease of searching.

Note that the semantic content may be any content of interest to users; this content may or may not be directly or indirectly machine extractable. Examples of such content may include: objects (e.g. things, people) in the image; relationships among objects in the image; attributes or properties of objects or relationships in the image; scene(s) in the image; environment in the image; context of the image; landmarks in the image; location where the image is taken; time when the image is taken; background in the image; features in the image; occasions in the image; events in the image; reasons why the image is taken; living things and non-living things in the image; mood of people in the image; and actions in the image.

The enrichment information may be used to automatically populate the fields or information within the MPEG-7 Structured Annotation Datatype, Keyword Annotation Datatype, Text Annotation Datatype or other Datatypes within the MPEG-7 standard or other standards such as XMP.

The image metadata, non-metadata, image acquisition parameters and/or other forms of internal or external data may be automatically, semi-automatically or manually generated.

According to the present invention the automated generation of high precision semantic image annotations and characterization, through which high precision searching of a vast amount of otherwise un-indexed image collections becomes feasible. Through such automatic techniques, the search of images via their semantic contents through automatic means is possible.

The operations described in this specification can be implemented as operations preformed by a data processing apparatus on data stored on one or more computer-readable storage devices or received from other sources. The term "data processing apparatus" encompasses all kinds of apparatus, devices, and machines for processing data, including by way of example a programmable processor, a computer, a system on a chip, or combinations of them. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, e.g., a virtual machine, or a combination of one or more of them. The apparatus and execution environment can realize various different computing model infrastructures, such as web services, distributed computing and grid computing infrastructures.

While the foregoing invention has been described in terms of the embodiments discussed above, numerous variations are possible. Accordingly, modifications and changes such as those suggested above, but not limited thereto, are considered to be within the scope of following claims.

What is claimed is:

1. A method of semantically characterizing the semantic attributes and contents of digital or non-digital images by
    using characterization rules to determine image contents and properties from image acquisition metadata, data affiliated with the image, and/or the image itself, the image, image acquisition metadata and data affiliated with the image being stored on a non-transitory computer-readable storage medium, and
    using probabilistic or deterministic relationships among the metadata and/or affiliated data to create a semantic image characterization which is used to enrich pre-existing metadata and/or affiliated data or is used to index the image contents in a computer readable storage medium in order to facilitate future retrieval of the image using semantic terms via a data processing apparatus,
    wherein the image acquisition metadata is selected from at least one of focal length, exposure time, relative aperture, flash information, ISO setting, angle of view, subject distance, timestamp, and GPS information, and
    wherein the characterization rules comprise one or more rules which infer image contents and properties by determining that when focal length belongs to a specific set of values, and exposure time belongs to a specific set of values, and subject distance belongs to a specific set of values, and timestamp belongs to a specific set of values, and relative aperture belongs to a specific set of values, that the image is of a certain type of scene or contains certain types of contents or having certain properties.

2. A method according to claim 1 wherein the affiliated data is selected from at least one of contents classification, tags, annotations, captions, keywords, headings, comments, remarks, titles, related texts, surrounding texts, or linked text.

3. The method of claim 1 wherein the characterization may be enhanced by extracting and processing the affiliated data.

4. The method of claim 1 wherein the images may be Web images, non-Web images, images located in other public or private image repositories, and the method can be applied to image databases, web searching, personal search, community search, broad-based or vertical search engines for internet, intranet, extranet or other usages.

5. The method of claim 1 wherein the characterization may be enhanced by correlating metadata and/or affiliated data with external or internal databases.

6. The method of claim 5 wherein the correlation comprises using GPS coordinates and timestamp metadata to determine the weather or news information from a weather or news database for the place and time of the image, or from other databases or geographic information systems.

7. The method of claim 1 wherein the semantic characterization includes one or more of objects in the image, relationships among objects in the image, attributes or properties of objects or relationships in the image, scene in the image, environment in the image, context of the image, landmarks in the image, location where the image is taken, time when the image is taken, background in the image, features in the image, occasions in the image, events in the image, reasons why the image was taken, living things and non-living things in the image, mood of people in the image, or actions in the image.

8. The method of claim 1 wherein the image metadata and/or affiliated data may be automatically, semi-automatically or manually generated.

9. The method of claim 1 wherein the characterization may be enhanced by applying known image processing and/or face recognition algorithms.

10. The method according to claim 1 wherein the characterization rules makes use of conjunction and/or disjunction in combining properties of the image acquisition metadata.

11. The method of claim 1 wherein the image acquisition metadata comprises EXIF (Exchangeable Image File Format) metadata.

12. The method of claim 1 wherein characterization of the image results from analysis of the image comprises the detection of faces, the recognition of faces, the recognition of fingerprints or recognition of other biometric data.

13. The method of claim 12 wherein annotations may be added to the image from databases of biometric data.

14. The method of claim 13 wherein the biometric data comprising facial features or fingerprints.

15. The method of claim 1 wherein characterization of the image comprising analysis of the image using image processing algorithms to determine shape, color, feature, or texture of the image.

16. The method of claim 15 wherein the image processing algorithm comprising SIFT (scale-invariant feature transformation).

17. The method of claim 1 wherein enriching pre-existing metadata comprises automatically populating one or more fields within image processing and classification standards such as the MPEG-7 standard.

18. The method of claim 17 wherein the one or more fields are selected from datatypes comprising Structured Annotation Datatype, Keyword Annotation Datatype, and Text Annotation Datatype.

* * * * *